United States Patent
Fangauf et al.

(10) Patent No.: US 10,550,890 B2
(45) Date of Patent: Feb. 4, 2020

(54) SEAL ASSEMBLY INCLUDING CONNECTING CHANNEL

(71) Applicant: SKF Marine GmbH, Hamburg (DE)

(72) Inventors: Carlos Fangauf, Hamburg (DE); Jörg Brand, Trittau (DE)

(73) Assignee: SKF MARINE GMBH, Hamburg (DE)

( * ) Notice: Subject to any disclaimer, the term of this patent is extended or adjusted under 35 U.S.C. 154(b) by 0 days.

(21) Appl. No.: 16/034,513

(22) Filed: Jul. 13, 2018

(65) Prior Publication Data

US 2019/0048934 A1   Feb. 14, 2019

(30) Foreign Application Priority Data

Aug. 8, 2017 (DE) .......................... 10 2017 213 830

(51) Int. Cl.
| | |
|---|---|
| *F16C 33/74* | (2006.01) |
| *F16C 33/10* | (2006.01) |
| *F16J 15/00* | (2006.01) |
| *F16F 9/26* | (2006.01) |
| *F16J 15/322* | (2016.01) |
| *F16J 15/3268* | (2016.01) |
| *F16F 9/36* | (2006.01) |

(52) U.S. Cl.
CPC .......... *F16C 33/743* (2013.01); *F16C 33/103* (2013.01); *F16C 33/105* (2013.01); *F16F 9/36* (2013.01); *F16J 15/002* (2013.01); *F16J 15/322* (2013.01); *F16J 15/3268* (2013.01); *F16C 2326/30* (2013.01)

(58) Field of Classification Search
CPC .. F16C 33/103; F16C 33/105; F16C 2326/30; F16C 15/3256; F16C 33/743; F16J 15/00; F16J 15/002; F16J 16/322; F16J 15/3268; F16J 15/322; F16F 9/36
USPC ............... 384/130, 132, 147, 153, 151, 477; 277/353, 549, 551, 586, 590
See application file for complete search history.

(56) References Cited

U.S. PATENT DOCUMENTS

| | | | | |
|---|---|---|---|---|
| 3,294,456 A | * | 12/1966 | Williams ................ | F16C 17/10 384/132 |
| 3,957,274 A | * | 5/1976 | Lang ....................... | F16C 33/72 277/412 |
| 5,799,950 A | * | 9/1998 | Allen ..................... | F16C 11/045 277/336 |

(Continued)

FOREIGN PATENT DOCUMENTS

| | | | | |
|---|---|---|---|---|
| FR | 2753769 A1 | * | 3/1998 | ............ F16C 11/045 |
| GB | 1260509 A | * | 1/1972 | .............. C10M 5/00 |

(Continued)

*Primary Examiner* — Marcus Charles

(57) ABSTRACT

A seal assembly for sealing a shaft bearing includes a seal housing, first and second seal rings retained by the seal housing, an annular chamber formed between the first and second seal rings and a connecting channel configured to place the annular chamber in fluid communication with a bearing-housing-side oil space. When the seal assembly is installed on a shaft, the connecting channel is configured to permit a fill-level equalization between the oil space and the annular chamber when the oil space is filled to a first possible fill level ($N_1$) and to prevent the fill-level equalization between oil space and annular chamber when the oil space is filled to a second possible fill level ($N_2$).

19 Claims, 3 Drawing Sheets

(56) References Cited

U.S. PATENT DOCUMENTS

| | | | | |
|---|---|---|---|---|
| 6,561,519 | B1* | 5/2003 | Frese | F16J 15/004 |
| | | | | 277/549 |
| 8,276,919 | B2* | 10/2012 | Abe | F15B 15/1461 |
| | | | | 277/549 |
| 8,672,007 | B2* | 3/2014 | Dahlhaus-Preussler | |
| | | | | F16J 15/002 |
| | | | | 152/415 |
| 9,033,345 | B2* | 5/2015 | Hintenlang | F16J 15/002 |
| | | | | 277/549 |
| 9,410,627 | B2* | 8/2016 | Fangauf | B63H 23/321 |
| 2004/0245728 | A1* | 12/2004 | Armour | F16J 15/324 |
| | | | | 277/549 |
| 2006/0267288 | A1* | 11/2006 | Freal | H02K 5/124 |
| | | | | 277/345 |
| 2008/0309016 | A1* | 12/2008 | Ozawa | F16F 9/36 |
| | | | | 277/345 |
| 2013/0264777 | A1* | 10/2013 | Himeno | F16J 15/3208 |
| | | | | 277/549 |

FOREIGN PATENT DOCUMENTS

| | | | | | |
|---|---|---|---|---|---|
| JP | 56003355 | A | * | 1/1981 | |
| JP | 05263945 | A | * | 10/1993 | |
| JP | 2003089399 | A | * | 3/2003 | B63H 23/321 |
| JP | 2009036282 | A | * | 2/2009 | B63H 23/321 |

* cited by examiner

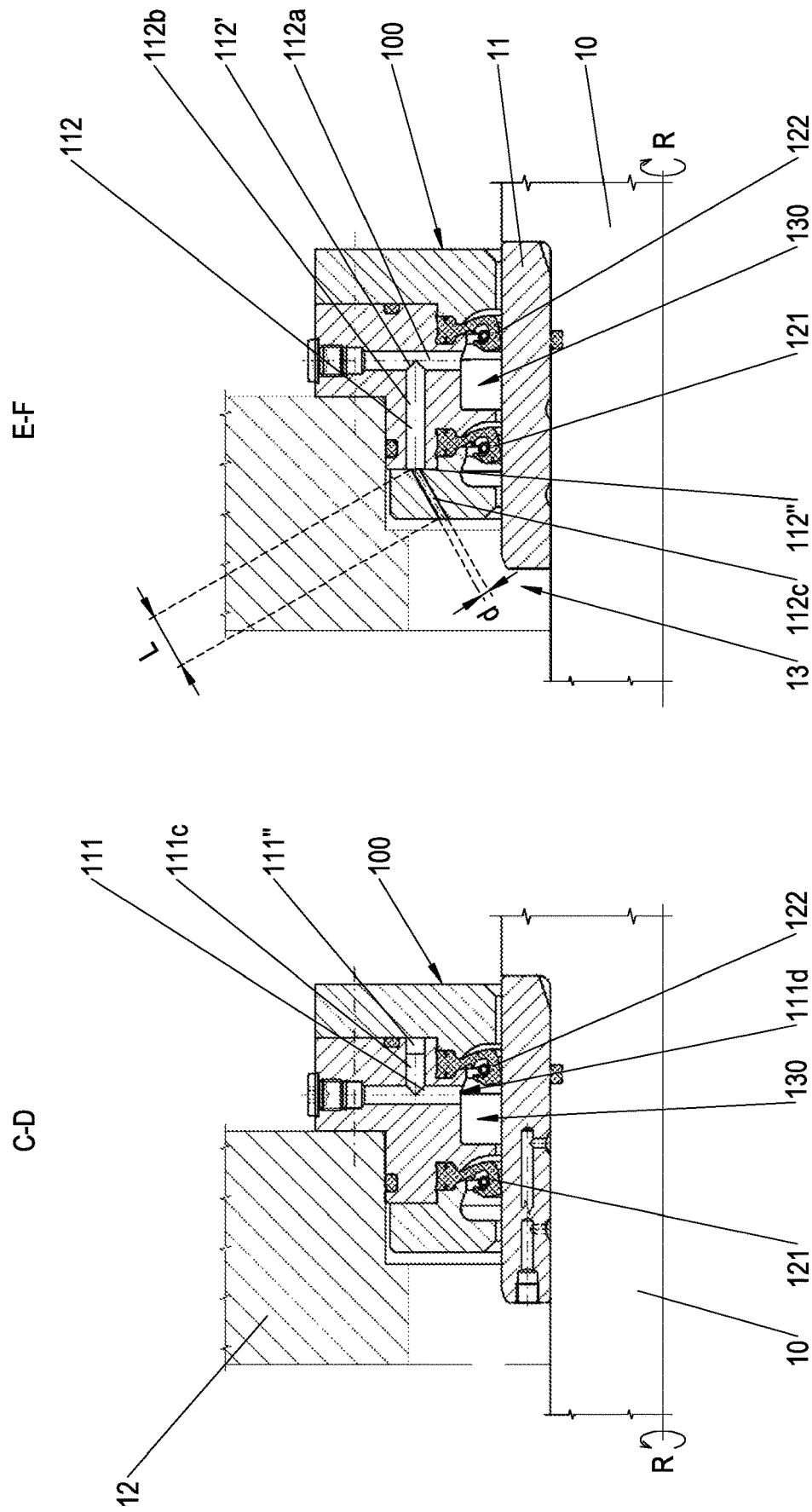

SEAL ASSEMBLY INCLUDING CONNECTING CHANNEL

CROSS-REFERENCE TO RELATED APPLICATIONS

This application claims priority to German patent application no. 10 2017 213 830.0 filed on Aug. 8, 2017, the contents of which are fully incorporated herein by reference.

TECHNOLOGICAL FIELD

The disclosure relates to a seal assembly for sealing a shaft bearing, for example, a thrust- or radial-bearing, in particular of an azimuth thruster of a ship.

Shaft bearings are generally disposed in special bearing housings, which include an oil space filled with oil up to a designated fill level for lubricating of the bearing. For sealing thereof, seal rings are generally used, which abut against the periphery of the shaft or against a shaft-protecting sleeve surrounding the shaft. Here the seal rings are generally retained in a seal housing that is offset in the axial direction relative to the bearing housing; in this document the specifications "axial" as well as "radial," "direction of rotation" and terms derived therefrom always refer—unless specified otherwise—to the (intended) axis of rotation of the shaft to be sealed.

Wear and tear, material fatigue, unforeseen loads and the like can cause a seal ring to be damaged and thereby restricted in its function or even fail completely. Since a prompt repair is not always possible or expedient, a reserve seal ring can be provided coaxially with a main seal ring, which reserve seal ring can assume the function of the main seal ring, at least temporarily until a repair can be made, in the case of a defect of the main seal ring.

The reserve seal ring also abuts against the shaft or a shaft-protecting sleeve surrounding the shaft and should therefore already be lubricated in a controlled manner at the time of its mere provision so that wear and the occurrence of wear particles can be kept low and a temperature increase can be prevented.

An aspect of the present disclosure is to provide a technology that is compact, robust, and space-saving to realize and that makes possible a reliable sealing of a shaft bearing.

The disclosed seal assembly serves for sealing a shaft bearing, for example, a thrust- or radial-bearing, in particular of an azimuth thruster of a ship. It comprises a seal housing and two seal rings retained thereby, which are each configured to encircle a shaft such that an annular chamber is formed between the seal rings. One of the seal rings (which is also referred to here as "auxiliary seal") is configured here so as to seal off a bearing-housing-side oil space (for example, enclosed by the bearing housing) along the shaft toward the annular chamber. The annular chamber is preferably delimited by the seal rings, a section of the periphery of the shaft or of a shaft-protecting sleeve, and a surface of the seal housing.

The bearing-housing-side oil space is connected to the annular chamber by a connecting channel. In the installed position of the seal assembly (i.e., in an orientation wherein a use of the installed seal assembly is provided), in a first possible (i.e., conceivable or settable) fill level of the oil space, the connecting channel realizes a (automatic) fill-level balancing between oil space and annular chamber, whereas in a second possible (conceivable or settable) fill level of the oil space the fill-level balancing is prevented by the connecting channel.

The connecting channel can have, for example, a channel bottom (on or over which oil can thus flow in the installed position), which in the installed position of the seal assembly lies continuously below the first possible fill level. If the oil space is filled up to the first possible fill level or beyond, the channel bottom is thus below the oil level (the oil surface), so that the automatic fill-level balancing between the oil space and annular chamber is ensured at the first fill level. Alternatively the connecting channel can be closed in an airtight manner between its ends, for example, and lie below the first possible fill level at its two ends (i.e. at its oil-chamber-side inlet and at its opening toward the annular chamber). If the connecting channel is then completely filled with oil after an initial filling, the suction effect causes an automatic fill-level equalization to occur from then on between the oil space and the annular chamber.

On the other hand, with the second possible fill level the fill-level equalization (in the installed position of the seal assembly) is prevented by the connecting channel. For example, in the installed position of the seal assembly one of the ends of the connecting channel (for example, of its opening into the annular chamber) can be disposed completely (in particular with its upper edge) above the second possible fill level, or the connecting channel can be air-permeable and include a channel bottom including a section that lies above the second possible fill level and thus prevents an oil flow at this fill level.

Due to the position of the connecting channel, the disclosed seal assembly makes possible in a simple and reliable manner a controlling of the filling of the annual chamber with oil: Thus for the normal case of the shaft bearing, i.e., with intact seal rings, a fill level for the oil space can preferably be set at the level of the first possible fill level (and adjusted via a supplying of the oil space). Since in this case the connecting channel realizes a fill-level equalization, the oil level in the annual chamber is also set to the level of the first possible fill level. Both seal rings are thus lubricated in a controlled manner, and the one of the two seal rings more removed from the oil space (which is also referred to here as the "main seal ring") seals the assembly toward the outside.

On the other hand, for the temporary case in the event of a defect of the main seal ring a fill level for the oil space can preferably be provided at or below the level of the second possible fill level (i.e., below the second horizontal cross-sectional plane) and adjusted via a supplying of the oil space. In this case the connecting channel prevents a fill-level equalization; thus no more oil can flow from the oil space into the annular chamber. While the auxiliary seal ring remains lubricated by its contact with the oil space, the annual chamber can therefore (due to the defect of the main seal ring) empty out; the auxiliary seal now assumes the function of the sealing of the shaft bearing.

Such a seal assembly is compact, robust and low-maintenance, and it does not require an additional valve for temporarily closing the connecting channel. The seal assembly is therefore realized in a particularly space-saving manner. The reserve seal can be activated in a simple manner if required by adjusting the fill level in the oil space.

The disclosed seal housing is configured to serve as a seal housing of the disclosed seal assembly according to one of the embodiments disclosed in this document. In particular, it is configured to retain the two seal rings with the formation of an annular chamber lying therebetween, and it includes a connecting channel that is configured to (with a corresponding installation of the seal housing) guide oil from a bearing-housing-side oil space into the annular chamber. In the installed position of the seal housing (or of the seal assembly), with a first possible fill level of the oil space the connecting channel realizes a fill-level equalization between oil space and annular chamber; on the other hand, with a second possible fill level of the oil space the connecting channel prevents such a fill-level equalization.

The first and the second possible fill level can each be understood as a first abstract horizontal cross-sectional plane through the oil space.

The first and the second possible fill level preferably depend on the respective shaft bearing that is provided to seal the seal assembly; the first possible fill level preferably lies at most at the height of a maximum fill level (e.g., specified by the manufacturer), the second at least at the height of a minimum fill level (e.g., specified by the manufacturer). A maximum fill level usually lies in the region of the center of the shaft.

The two seal rings can be configured differently or identically; preferably both have the same sliding diameter. Here the diameter of the seal ring is to be understood as "sliding diameter" D of a seal ring, wherein the seal ring abuts against or (with rotation of the shaft) slides along the shaft or a shaft-protecting sleeve.

According to one advantageous embodiment of the present disclosure, the first possible fill level lies above a bottom (i.e., a lowest-lying point) of the annular chamber (in the installed position) by at most 100%, 80%, 60%, 50% or even at most 40% of the sliding diameter D of one of the seal rings (or both seal rings). Accordingly, for a distance $d_1$ of the first possible fill level from the bottom of the annular chamber (in the installed position), $d_1 \leq D$, more preferably $d_1 \leq 0.8D$ or $d_1 \leq 0.6D$ or $d_1 \leq 0.5D$ or even $d_1 \leq 0.4D$.

The second possible fill level preferably falls below the first possible fill level by at least 5%, at least 10% or at least 15% of the sliding diameter D.

Embodiments are advantageous wherein a distance $d_2$ of the second possible fill level from the bottom of the annular chamber is at most 95%, at most 90%, at most 85% or at most 80% of a distance $d_1$ of the first possible fill level from the bottom of the annular chamber and/or at least 20%, at least 30%, at least 40%, at least 60% or at least 70% of a distance $d_1$ of the first possible fill level from the bottom of the annular chamber. Accordingly, it is preferably true that $d_2 \leq 0.95 \cdot d_1$ or $d_2 \leq 0.9 \cdot d_1$ or $d_2 \leq 0.85 \cdot d_1$ or $d_2 \leq 0.8 \cdot d_1$ and/or $d_2 \geq 0.2 \cdot d_1$ or $d_2 \geq 0.3 \cdot d_1$ or $d_2 \geq 0.4 \cdot d_1$ or $d_2 \geq 0.6 \cdot d_1$ or $d_2 \geq 0.7 \cdot d_1$. An oil space set to such a second fill level still allows a good lubrication of the shaft bearing for the temporary case; in addition, a minimum spacing of the two possible fill levels from each other is ensured by these distances.

In the installed position, an opening of the connecting channel into the annular chamber and/or an oil-chamber-side inlet of the connecting channel are/is preferably disposed between the first and the second possible fill level.

According to one preferred embodiment of the present disclosure, the connecting channel has an opening into the annular chamber, which opening in a deepest point of its edge in an installed position or in a central point in an installed position has a distance a from the first possible fill level, for which it is true that $D/20 \leq a \leq 2D/3$, in particular a distance a is preferred in the range $D/11 \leq a \leq D/9$; here D is the sliding diameter of at least one of the seal rings. In particular, the opening does not lie too close to the first possible fill level, so that despite the oil moving in the bearing (due to the shaft rotation and the cooling circulation) a reliable supplying of the annular chamber can usually occur. Analogously, an oil-chamber-side inlet of the connecting channel can have such a distance a from the first possible fill level in a lowest point of its edge in the installed position or in a central point in the installed position.

For a distance b of a lowest point of an edge of the opening of the connecting channel into the annular chamber in the installed position or a central point of the opening in the installed position from the second possible fill level it is preferably true that $D/20 \leq b \leq 2D/3$, in particular a distance b is preferred in the range $D/11 \leq b \leq D/9$; here D is the sliding diameter of at least one of the seal rings. In particular, the opening thus does not lie too close to the second possible fill level, so that in the temporary case the oil supply into the annular chamber can be prevented despite the oil moving in the bearing. Analogously, in the installed position an oil-chamber-side inlet of the connecting channel can have a central point or an edge having a lowest point, which is disposed at such a distance b from the second possible fill level.

Advantageous in particular is an embodiment wherein for the above-defined distances a and b it is true that $D/10 \leq a+b \leq D/3$ or even $D/6 \leq a+b \leq D/4$; here D is the sliding diameter of at least one of the seal rings.

According to one advantageous embodiment, a section of the connecting channel lying above the second possible fill level in the installed position can open radially into the annular chamber; this makes possible a particularly simple manufacturing of the seal housing including the connecting channel, in particular the section of the connecting channel can be realized as a bore through a housing ring of the seal housing.

The connecting channel can include a section that partially encircles the shaft, for example, having a center angle of at least 60°, at least 70°, or at least 80° about the axis of rotation of the shaft. Here such a section can extend purely in the circumferential direction or have an axial directional component in addition to an extension in the circumferential direction (and thus, for example, extend helically).

One embodiment variant is advantageous wherein at least one section of the connecting channel extends between two housing rings of the seal housing. In such a section the connecting channel can be introduced, for example, prior to the assembly of the housing rings, in at least one surface of such a housing ring, in particular turned-in or milled-in. Such an embodiment is particularly simple to manufacture and to service. In particular a section partially encircling the shaft as mentioned above can preferably extend between two housing rings. The connecting channel can preferably be sealed toward the shaft by a seal-ring bead, toward the outside, for example, by an O-ring.

The annular chamber can be vented outwardly, for example, by a venting line.

According to one advantageous embodiment, the disclosed seal assembly includes a venting channel in the seal housing, which in the installed position extends above the first possible fill level and connects the annular chamber and the oil space. Such a venting channel, which can be realized by at least one bore through a seal housing element (for example a housing ring of the seal housing), makes possible a compact design of the seal assembly including venting and a simple installation. In particular, tubing projecting outward for venting the annular chamber can be omitted.

According to one advantageous embodiment the venting channel includes at least one bend or one curve. In particular in a situation wherein the annular chamber is run dry due to a defect of the main seal ring and wherein the auxiliary seal ring has taken over the sealing (with a fill level of the oil space set below the level of the second possible fill level) an ingress of spray oil through the venting channel into the annular chamber can be minimized.

In the installation position a section of the venting channel opening into the oil space preferably drops off toward the oil space. Such an inclination advantageously causes some of the spray oil entering into the venting channel from the oil space to flow back into the oil space.

Such a sloping section preferably has a length L that is at least three times as large as a diameter d of the opening of the venting channel into the oil space. Conversely, the diameter d of the opening of the venting channel into the oil space is thus at most one third of the length of the sloping section. A small opening of this type minimizes the amount of injecting oil, and the relatively large length of the descending section also prevents, even with a steep arrangement of the venting channel, some oil sprayed-in from the oil space from penetrating into the venting channel via the descending section.

In the following, preferred exemplary embodiments of the disclosure are explained in more detail with reference to the drawings. It is understood that individual elements and components can also be combined differently than depicted. Reference numbers for mutually corresponding elements are used in a general manner with respect to the Figures and may not necessarily be described anew for each Figure.

BRIEF DESCRIPTION OF THE DRAWINGS

FIGS. 1a-1d show cross-sections of an exemplary seal assembly according to the present disclosure in various sections.

DETAILED DESCRIPTION

Figure 1B:
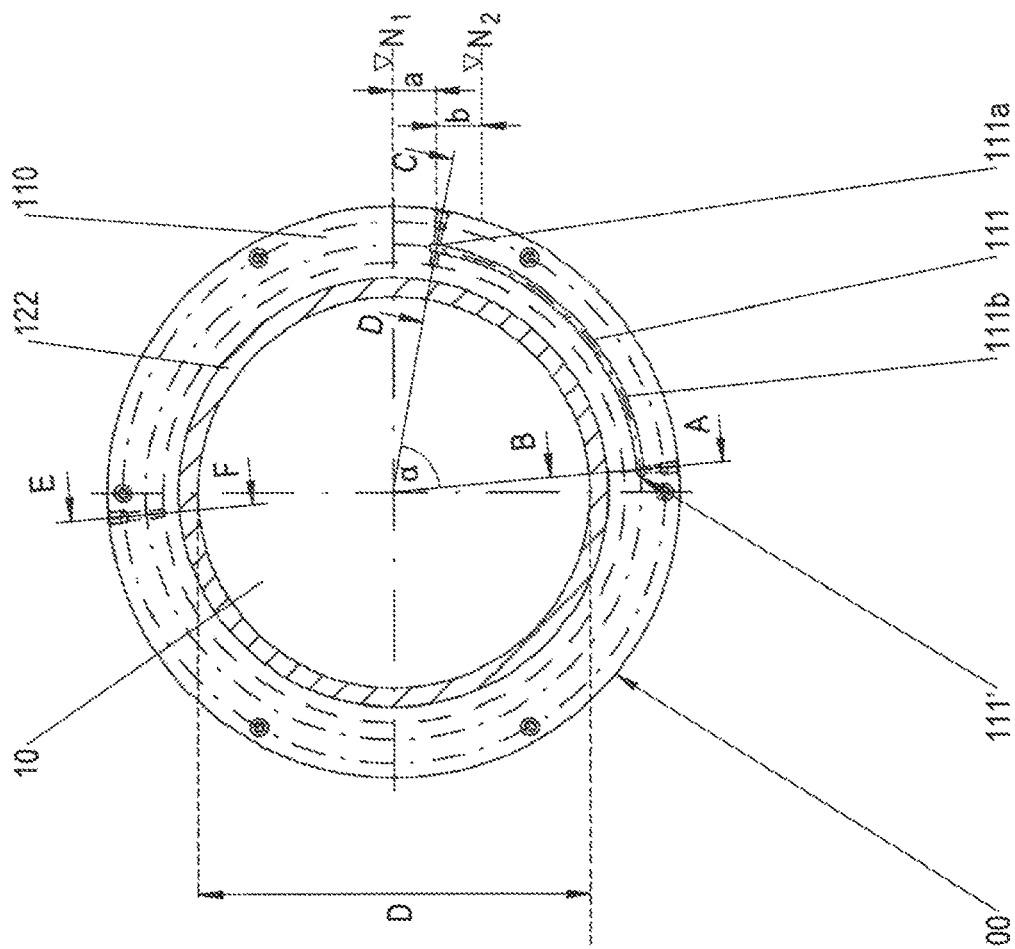
Figure 1A:
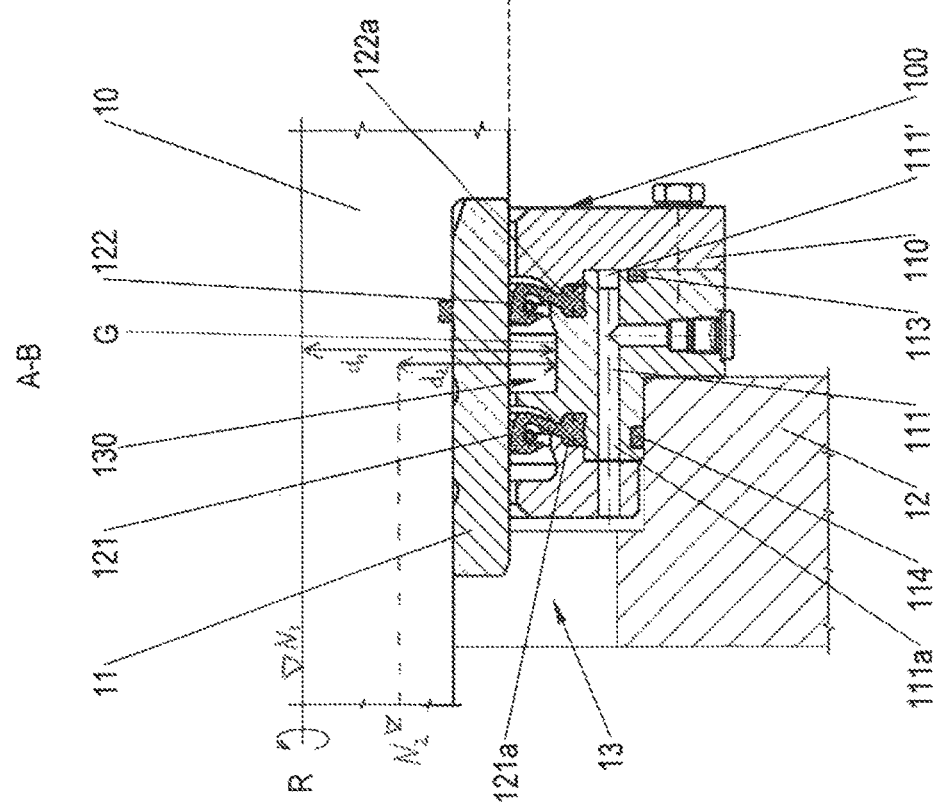

In FIGS. 1a-1d various sections of an exemplary embodiment of the disclosed seal assembly 100 are each shown in section. The seal assembly 100 serves to seal the (not-shown) bearing of a shaft 10, which is disposed in a (partly shown) bearing housing 12. FIGS. 1a, 1c, and 1d show a cross-section along the intended axis of rotation R of the shaft 10 which is horizontal in the installed position (wherein the respective sectional planes have different inclinations with respect to the horizontal); in FIG. 1b a cross-section is shown perpendicular to this axis R.

The seal assembly 100 comprises a seal housing 110 as well as, in the present case, two identically formed seal rings 121 and 122 retained by the seal housing, which seal rings 121 and 122 each abut on a shaft-protecting sleeve 11 of the shaft 10 and thus both have the same sliding diameter D. An annular chamber 130 is formed between the seal rings 121 and 122 that is delimited by the shaft-protecting sleeve 11, the seal housing 110, and the seal rings 121, 122.

In the seal housing 110 a connecting channel 111 is formed that includes a section 111a starting from a bearing-housing-side oil space 13 that extends horizontally in the present case. At point 111' the connecting channel 111 has a bend and here leaves the sectional plane visible in FIG. 1a; its further course is shown in FIG. 1b, wherein it can be seen that the connecting channel 111 partially encircles the shaft 10 in a section 111b extending in the rotational direction (namely around the center angle α, which in the present case is between 75° and 90°). For example, the connecting channel can be introduced (wholly or partially) in this section 111b in at least one surface of at least one housing ring, in particular turned-in or milled-in, from which the housing 110 among other things can be assembled. In the case shown, the connecting channel 111 is sealed toward the shaft by seal ring beads 121a, 122b; O-rings 113 and 114 serve as outward seals.

In FIG. 1b a first possible fill level $N_1$ and a second possible fill level $N_2$ are marked for the oil space 13 (visible in FIG. 1a) surrounding a section of the shaft 10; here all fill levels that are conceivable or settable between the empty and the full oil space are to be understood as "possible" fill levels that define an abstract horizontal cross-sectional plane. Preferably $N_1$ corresponds to a fill level specified by the bearing manufacturer; it is usually located in the region of the intended axis of rotation R of the shaft.

Embodiments are advantageous wherein the first possible fill level $N_1$ lies at most 100%, 80%, 60%, 50% or even at most 40% of the slide diameter D of one of the seal rings above the bottom of the annular chamber (in the installed position). In the example shown in FIG. 1b the marked first possible fill level lies at the height of the axis of rotation R and the second possible fill level $N_2$ therebelow.

The distance a+b from $N_1$ to $N_2$ is preferably in the range from 10% to 77% of the sliding diameter D of at least one of the seal rings, in particular between 15% and 25% of the sliding diameter.

In a further bend 111' the connecting channel merges into a section 111c, which is depicted in FIG. 1c and which leads into the annular chamber 130.

In the installed position the connecting channel 111 of the embodiment shown in FIGS. 1a-1c is thus disposed continuously below the first possible fill level $N_1$; in particular its channel bottom, on which oil can flow, extends below this fill level $N_1$. When the oil space has a fill level at the level of this fill level $N_1$, the connecting channel 111 is thus flooded continuously, i.e., it sets the same oil level in the oil space 13 and the annular chamber 130. Both seal rings 121 and 122 are thus lubricated and thus protected from excessive wear and heat development. Here the seal ring 122 represents the main seal ring, which in the usual case (namely as long as it is intact) ensures the sealing of the shaft bearing; the seal ring 121 is the auxiliary seal ring for the case of a defect of the main seal ring 122.

In the region around a second bend 111", in particular in section 111c, which in the present case represents the vertically highest section of the connecting channel in the installed position, the channel bottom extends above the second possible fill level $N_2$. The opening 111d into the annular chamber has a distance a (in a central point or a lowest point in the installed position) from the first possible fill level $N_1$, wherein, for example, it applies that $D/20 \leq a \leq 2D/3$, in the present case even $D/9 \leq a \leq D/11$. For the second possible fill level $N_2$ the opening 111d has a distance b (in a central point or a lowest point in the installed position), which, analogous to the inequality $D/20 \leq b \leq 2D/3$, in the present case satisfies $D/9 \leq b \leq D/11$.

Due to the position of the opening 111d above the second possible fill level $N_2$, even with a connecting channel 111 sealed in an air-tight manner a flow from the oil space 13 into the annular chamber 130 can be prevented by a lowering of the fill level in the oil space 13 to this first fill level $N_2$; the connecting channel 111 then prevents a fill-level equalization between oil space and annular chamber. In the case of a defect of the main seal ring 122, wherein oil flows outward from the annular chamber 130, in this way an afterflow of oil from the oil space can be prevented and the annular chamber 130 is thus drained. In this case the auxiliary seal ring 121 then effects the reliable sealing of the shaft bearing.

In FIG. 1d a cross-section of the seal assembly 100 is depicted in a further section, which in the installed position lies above the first possible fill level $N_1$: In the exemplary embodiment shown a venting channel 112 is formed in this region, which venting channel 112 connects the annular chamber 130 to the oil space 13.

In the example shown, the venting channel 112 comprises a first section 112a as well as a second section 112b and a third section 112c, which are separated from one another by bends 112' or 112" such that (in particular in the temporary case when the annular chamber 130 is drained) the penetration of spray oil through the venting channel 112 into the annular chamber is reduced. In addition, in the present case the third section 112c is formed narrower than the sections 112a, 112b, which further reduces the probability of spray oil penetration.

Furthermore, in the installed position shown, the section 112c drops off over a length L toward the oil space 13 so that in this region if appropriate any sprayed-in oil can flow back into the oil space. At its opening into the oil space the venting channel has a diameter d. An embodiment is particularly advantageous for which $d \leq L/3$ holds: The possibility of spray oil penetrating though the venting channel into the annular chamber is thereby further minimized.

Figure 2:
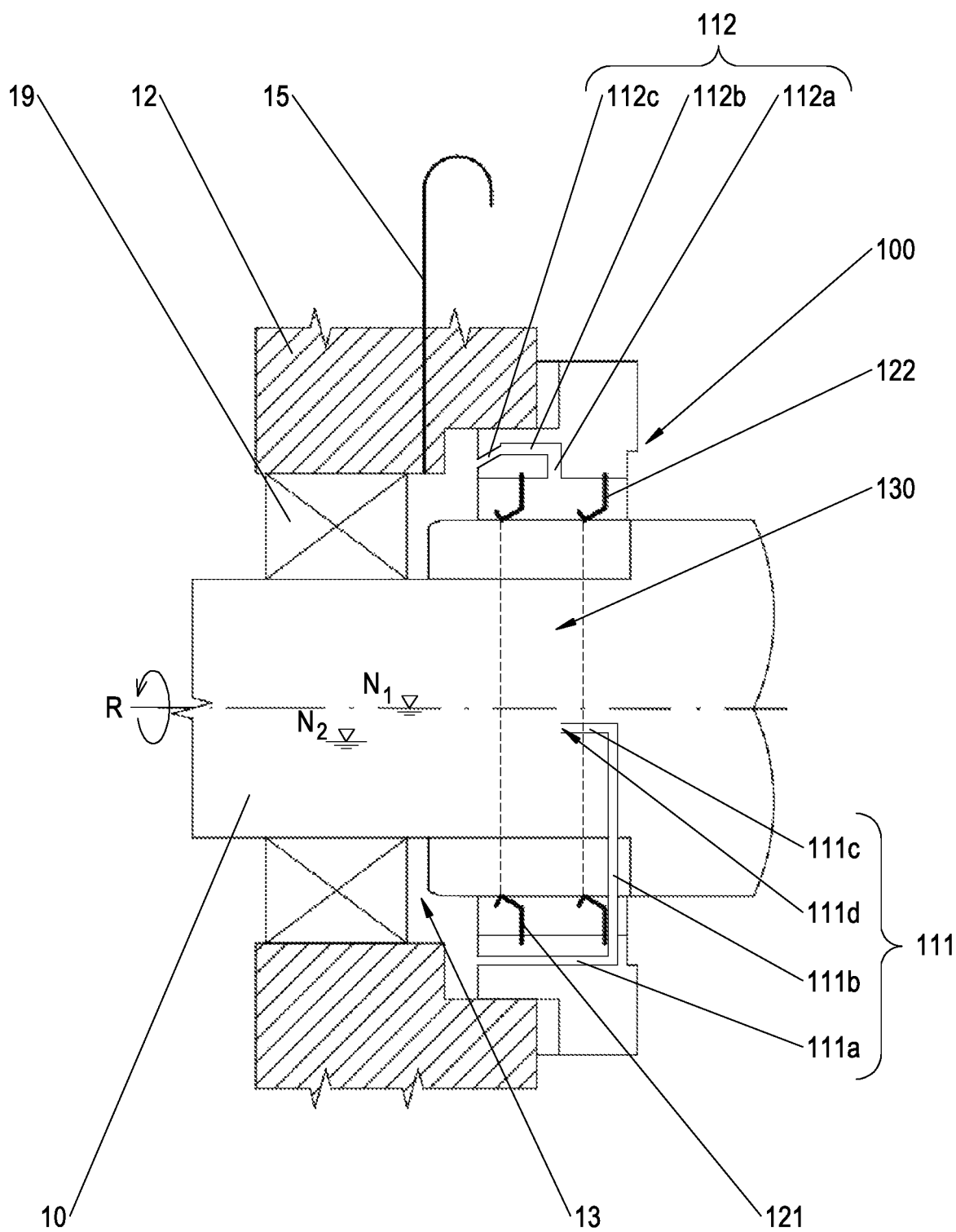
FIG. 2 shows a schematic overview depiction of the seal assembly of FIGS. 1a-1d.

In FIG. 2 a simplified view is shown of the seal assembly 100 for sealing a shaft bearing 14 of the shaft 10 in the installed position. To be noted in particular is the connecting channel 111, extending continuously below the first possible fill level $N_1$ of the oil space, including the sections 111a, 111b, 111c, of which the section 111b partially encircles the shaft 10 and of which the section 111c (including its associated channel bottom and the opening 111d into the annular chamber 130) lies above the second possible fill level $N_2$ of the oil space 13.

In the upper region a venting channel 112 is disposed whose section 112c opening into the oil space drops off toward the oil space 13. The oil space 13 in turn includes a venting line 15 outside the bearing housing 12.

A seal assembly 100 for sealing a shaft bearing 14 is disclosed, which comprises a seal housing 110 as well as two seal rings 121, 122 retained by the seal housing. The seal rings 121, 122 are each configured to encircle a shaft 10 so that an annular chamber 130 is formed between them. The annular chamber 130 is connected to the oil space 13 by a connecting channel 111. In the installed position of the seal assembly, with a first possible fill level $N_1$ of the oil space the connecting channel realizes a fill-height compensation between oil space and annular chamber; with a second possible fill level $N_2$ of the oil space the connecting channel prevents the fill-height compensation.

Furthermore, a seal housing 110 for such a seal assembly is disclosed.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Shaft
11 Shaft-protecting sleeve
12 Bearing housing
13 Oil space
14 Shaft bearing
15 Venting line of the oil space
100 Seal assembly
110 Seal housing
111 Connecting channel
111a, 111b, 111c Sections of the connecting channel 111
111d Opening of the connecting channel into the annular chamber 130
111', 111" Bends of the connecting channel
112 Venting channel of the annular chamber 130
112a, 112b, 112c Sections of the venting channel 112
112', 112" Bends of the venting channel 112
113, 114 O-ring
121 Seal ring (auxiliary seal ring)
122 Seal ring (main seal ring)
122a Seal ring bead of the seal ring 122
130 Annular chamber
d Diameter of the venting channel at its opening into the oil space 13
$d_1$ Distance of the first possible fill level from the bottom of the annular chamber
$d_2$ Distance of the second possible fill level from the bottom of the annular chamber
D Sliding diameter of the seal rings
G Bottom of the annular chamber in the installed position
L Length of section 112c of the venting channel
$N_1$ First possible fill level
$N_2$ Second possible fill level
R Axis of rotation of the shaft 1

The invention claimed is:

1. A seal assembly for sealing a shaft bearing, the seal assembly comprising:
   a seal housing;
   a first seal ring and a second seal ring retained by the seal housing, the first seal ring and the second seal ring each being configured to encircle a shaft and the first seal ring having a sliding diameter D,
   an annular chamber formed between the first seal ring and the second seal ring; and a connecting channel configured to place the annular chamber in fluid communication with a bearing-housing-side oil space, wherein, when the seal assembly is installed on a shaft, the connecting channel is configured to permit a fill-level equalization between the oil space and the annular chamber when the oil space is filled to a first possible fill level ($N_1$), and to prevent the fill-level equalization between oil space and annular chamber when the oil space is filled to a second possible fill level ($N_2$).

2. The seal assembly according to claim 1,
wherein, when the seal assembly is installed on the shaft, the first possible fill level ($N_1$) lies above a bottom of the annual chamber by at most 100% of the sliding diameter D.

3. The seal assembly according to claim 2,
wherein, when the seal assembly is installed on the shaft, a distance ($d_2$) of the second possible fill level ($N_2$) from the bottom of the annular chamber is at most 95%, of a distance ($d_1$) of the first possible fill level ($N_1$) from the bottom of the annular chamber and at least 20% of a distance ($d_1$) of the first possible fill level ($N_1$) from the bottom of the annular chamber.

4. The seal assembly according to claim 2,
wherein, when the seal assembly is installed on the shaft, a distance ($d_2$) of the second possible fill level ($N_2$) from the bottom of the annular chamber is at most 80%, of a distance ($d_1$) of the first possible fill level ($N_1$) from the bottom of the annular chamber and at least 70% of a distance ($d_1$) of the first possible fill level ($N_1$) from the bottom of the annular chamber.

5. The seal assembly according to claim 1,
wherein, when the seal assembly is installed on the shaft, the first possible fill level ($N_1$) lies above a bottom of the annual chamber by at most 40% of the sliding diameter D.

6. The seal assembly according to claim 5,
wherein, when the seal assembly is installed on the shaft, a distance ($d_2$) of the second possible fill level ($N_2$) from the bottom of the annular chamber is at most 95%, of a distance ($d_1$) of the first possible fill level ($N_1$) from the bottom of the annular chamber and at least 20% of a distance ($d_1$) of the first possible fill level ($N_1$) from the bottom of the annular chamber.

7. The seal assembly according to claim 5,
wherein, when the seal assembly is installed on the shaft, a distance ($d_2$) of the second possible fill level ($N_2$) from the bottom of the annular chamber is at most 80%, of a distance ($d_1$) of the first possible fill level ($N_1$) from the bottom of the annular chamber and at least 70% of a distance ($d_1$) of the first possible fill level ($N_1$) from the bottom of the annular chamber.

8. The seal assembly according to claim 1,
wherein, when the seal assembly is installed on the shaft, an opening of the connecting channel into the annular chamber or an oil-chamber-side inlet of the connecting channel in a deepest or a central point has a distance (a) from the first possible fill level ($N_1$) that satisfies the relation $D/20 \leq a \leq 2D/3$.

9. The seal assembly according to claim 1,
wherein, when the seal assembly is installed on the shaft, an opening of the connecting channel into the annular chamber or an oil-chamber-side inlet of the connecting channel in a deepest or a central point has a distance (a) from the first possible fill level ($N_1$) that satisfies the relation $D/11 \leq a \leq D/9$.

10. The seal assembly according to claim 1,
wherein, when the seal assembly is installed on the shaft, an opening of the connecting channel into the annular chamber or an oil-chamber-side inlet of the connecting channel in a deepest or a central point has a distance (b) from the second possible fill level ($N_2$) that satisfies the relationship $D/20 \leq b \leq 2D/3$.

11. The seal assembly according to claim 1,
wherein, when the seal assembly is installed on the shaft, an opening of the connecting channel into the annular chamber or an oil-chamber-side inlet of the connecting channel in a deepest or a central point has a distance (b) from the second possible fill level ($N_2$) that satisfies the relationship $D/11 \leq b \leq D/9$.

12. The seal assembly according to claim 1, wherein the connecting channel includes a section that partially encircles the shaft.

13. The seal assembly according to claim 1, wherein a section of the connecting channel extends between two housing rings of the seal housing.

14. The seal assembly according to claim 1, wherein the seal housing includes a venting channel extending above the first possible fill level ($N_1$) of the oil space and connecting the annular chamber to the oil space.

15. The seal assembly according to claim 14, wherein the venting channel includes at least one bend.

16. The seal assembly according to claim 14, wherein, the venting channel includes a descending section that drops off into the oil space.

17. The seal assembly according to claim 16, wherein the descending section has a length (L) that is at least three times a diameter (d) of an opening of the venting channel into the oil space.

18. The seal assembly according to claim 1,
wherein the connecting channel includes a section that partially encircles the shaft,
wherein a section of the connecting channel extends between two housing rings of the seal housing,
wherein the seal housing includes a venting channel extending above the first possible fill level ($N_1$) of the oil space and connecting the annular chamber to the oil space,
wherein the venting channel includes at least one bend, and
wherein the venting channel includes a descending section that drops off into the oil space.

19. A seal assembly for sealing a shaft bearing, the seal assembly comprising:
a seal housing;
a first seal ring and a second seal ring retained by the seal housing, the first seal ring and the second seal ring each being configured to encircle a shaft and the first seal ring having a sliding diameter D,
an annular chamber formed between the first seal ring and the second seal ring; and
a connecting channel having a first opening in the annular chamber and a second opening in a bearing-housing-side oil space,
wherein when the seal assembly is installed on a shaft, the bearing-housing-side oil space has a maximum operating fill level and a minimum operating fill level, and
wherein the second opening is located at a distance from a bottom of the bearing-housing-side oil space greater than the minimum operating fill level and less than the maximum operating fill level.

* * * * *